United States Patent
Van Polen

(10) Patent No.: US 9,180,891 B2
(45) Date of Patent: Nov. 10, 2015

(54) HVAC SYSTEM FOR HEATING AND COOLING A MOBILE MACHINE CABIN

(75) Inventor: Jerry Van Polen, Oak Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 727 days.

(21) Appl. No.: 13/436,606

(22) Filed: Mar. 30, 2012

(65) Prior Publication Data
US 2013/0255907 A1 Oct. 3, 2013

(51) Int. Cl.
*F25B 29/00* (2006.01)
*B60H 1/00* (2006.01)
*B61C 5/02* (2006.01)
*B60H 1/14* (2006.01)

(52) U.S. Cl.
CPC ... *B61C 5/02* (2013.01); *B60H 1/14* (2013.01)

(58) Field of Classification Search
CPC ... F25B 13/00; F25B 29/003; B60H 1/00899; B60H 1/00985; B60H 2001/00942; B60H 2001/00949
USPC ............... 165/41, 42, 43, 44, 202, 203, 204; 62/159, 244
See application file for complete search history.

(56) References Cited

U.S. PATENT DOCUMENTS

| | | | | |
|---|---|---|---|---|
| 3,628,348 A * | 12/1971 | Dixon | ............................... | 62/244 |
| 3,628,349 A * | 12/1971 | Dixon | ............................... | 62/244 |
| 3,703,146 A | 11/1972 | Kovats | | |
| 3,712,077 A * | 1/1973 | Dixon | ............................... | 62/244 |
| 3,724,232 A * | 4/1973 | Dixon et al. | ....................... | 62/244 |
| 3,848,428 A * | 11/1974 | Rieter, Jr. | ........................... | 62/244 |
| 3,855,814 A * | 12/1974 | Eubank | ............................ | 62/244 |
| 4,007,875 A * | 2/1977 | Stolz et al. | ........................ | 62/244 |
| 4,043,143 A * | 8/1977 | Fluder et al. | ...................... | 62/244 |
| 4,051,768 A * | 10/1977 | Bayles | ............................. | 62/244 |
| 4,167,967 A * | 9/1979 | Kumagai | ........................... | 165/43 |
| 4,335,706 A * | 6/1982 | Passarelli et al. | ............... | 126/645 |
| 4,414,462 A | 11/1983 | Price | | |
| 4,415,018 A | 11/1983 | Rosenberger | | |
| 4,551,986 A * | 11/1985 | Anderson et al. | ............... | 62/244 |
| 4,603,733 A | 8/1986 | Loevinger | | |
| 4,630,530 A * | 12/1986 | Eckstrom et al. | ............... | 62/244 |
| 4,727,728 A * | 3/1988 | Brown | ............................. | 62/244 |
| 4,748,825 A * | 6/1988 | King | ............................... | 62/244 |
| 4,888,959 A * | 12/1989 | Brown | ............................. | 62/244 |
| 4,891,940 A * | 1/1990 | Tamba et al. | .................... | 165/44 |
| 4,926,655 A * | 5/1990 | King | ............................... | 62/244 |
| 4,982,583 A * | 1/1991 | Matsuda et al. | ................. | 62/244 |
| 5,005,372 A * | 4/1991 | King | ............................... | 62/244 |
| 5,107,920 A * | 4/1992 | Scotti et al. | ...................... | 165/41 |
| 5,111,874 A * | 5/1992 | Kosson | ............................ | 165/41 |
| 5,220,808 A * | 6/1993 | Mayer | ............................. | 62/244 |
| 5,307,645 A * | 5/1994 | Pannell | ........................... | 62/244 |
| 5,613,371 A * | 3/1997 | Nelson | ............................ | 62/244 |
| 5,628,203 A | 5/1997 | Adolph et al. | | |
| 5,687,573 A * | 11/1997 | Shih | ................................ | 62/244 |

(Continued)

*Primary Examiner* — Ljiljana Ciric

(74) *Attorney, Agent, or Firm* — Finnegan, Henderson, Farabow, Garrett & Dunner, LLP

(57) ABSTRACT

An HVAC system for a mobile machine having a frame and a cabin supported by the frame. The HVAC system includes a first heat exchanger configured to exchange heat between coolant and the frame of the mobile machine and a first pump configured to circulate coolant through the first heat exchanger. The HVAC system also includes a second heat exchanger configured to receive coolant from the first heat exchanger and a fan configured to generate a flow of air through the second heat exchanger and into the cabin.

14 Claims, 3 Drawing Sheets

(56) References Cited

U.S. PATENT DOCUMENTS

| | | | |
|---|---|---|---|
| 5,806,803 A * | 9/1998 | Watts | 165/41 |
| 5,816,064 A * | 10/1998 | Moore et al. | 62/244 |
| 5,823,477 A * | 10/1998 | York | 165/41 |
| 5,878,592 A * | 3/1999 | Borges et al. | 62/244 |
| 6,068,046 A * | 5/2000 | Pommier et al. | 165/42 |
| 6,230,795 B1 * | 5/2001 | Tsunooka et al. | 165/203 |
| 6,238,282 B1 | 5/2001 | Kindel et al. | |
| 6,339,934 B1 * | 1/2002 | Yoon et al. | 62/244 |
| 6,494,052 B1 * | 12/2002 | Lee | 62/244 |
| 6,662,572 B1 * | 12/2003 | Howard | 62/244 |
| 6,701,733 B2 * | 3/2004 | Brunner | 165/41 |
| 6,851,470 B2 * | 2/2005 | Laukhuf | 165/202 |
| 6,883,588 B1 * | 4/2005 | Low et al. | 165/41 |
| 6,932,148 B1 * | 8/2005 | Brummett et al. | 165/43 |
| 7,325,595 B2 * | 2/2008 | Homan et al. | 165/204 |
| 7,367,291 B2 | 5/2008 | Marsh et al. | |
| 7,380,587 B2 * | 6/2008 | Naruse et al. | 165/202 |
| 7,434,608 B2 * | 10/2008 | Shindo et al. | 165/42 |
| 7,448,227 B2 * | 11/2008 | Zeigler et al. | 165/202 |
| 7,520,465 B2 * | 4/2009 | Mahjoub | 165/44 |
| 7,798,134 B2 | 9/2010 | Marsh et al. | |
| 7,913,505 B2 * | 3/2011 | Nakamura | 62/244 |
| 8,443,871 B2 * | 5/2013 | Hayashi et al. | 165/202 |
| 8,596,201 B2 * | 12/2013 | Kral | 105/62.2 |
| 9,016,411 B2 * | 4/2015 | Nam et al. | 165/44 |
| 9,027,676 B2 * | 5/2015 | Nakashima et al. | 165/41 |
| 2002/0036076 A1 | 3/2002 | Eastman | |
| 2004/0129407 A1 * | 7/2004 | Stone et al. | 165/41 |
| 2005/0066679 A1 * | 3/2005 | Boyer et al. | 62/244 |
| 2010/0269530 A1 * | 10/2010 | Ichikawa | 62/244 |
| 2011/0030406 A1 * | 2/2011 | Ichikawa et al. | 62/244 |
| 2011/0061414 A1 * | 3/2011 | McAllister et al. | 62/244 |
| 2013/0152819 A1 * | 6/2013 | Kral | 105/62.2 |
| 2013/0284529 A1 * | 10/2013 | Kral et al. | 180/68.1 |

* cited by examiner

HVAC SYSTEM FOR HEATING AND COOLING A MOBILE MACHINE CABIN

TECHNICAL FIELD

The present disclosure relates generally to a heating, air conditioning, and ventilation (HVAC) system, and more particularly, to an HVAC system for a mobile machine.

BACKGROUND

Most mobile machines include an operator cabin having a controlled environment that increases operator comfort. For example, the operator cabin can be heated, air conditioned, and or ventilated to maintain the operator cabin at a desired temperature. High-pressure air conditioning is a well known mechanism for cooling an enclosed space. However, conventional high-pressure air conditioners are bulky and inconvenient for mobile applications. Conventional air conditioners are also large and difficult to install. Resistive heating elements are also well known mechanisms and are commonly used for heating mobile machine cabins. While resistive heating elements do not generally suffer from space constraints, they are relatively inefficient at converting electrical energy into heat energy.

Some manufacturers of mobile machines have attempted to overcome the deficiencies of air conditioners and resistive heating elements by utilizing air-to-air heat pumps. In air-to-air heat pumps, heat is absorbed in an evaporator at a first location and released in a condenser at a second location. These systems are reversible so that the cabin of the machine may either be cooled or heated by the same system. In heating applications, air-to-air heat pump systems can be up to 300% efficient. Unfortunately, air-to-air heat pumps can also be expensive to maintain. Components of a heat pump are also relatively expensive, require expensive coolant, and need frequent maintenance.

An alternative system for cooling and heating a locomotive cabin is described in U.S. Pat. No. 5,628,203 ("the '203 patent") of Adolph that issued on May 13, 1997. The '203 patent describes a locomotive having a heat exchanger, a turbine, and a compressor, all used to heat and cool the locomotive cabin. In a cooling operation, outside air is expanded in the turbine, cooled below ambient temperature, and introduced into the heat exchanger. Hot air from the cabin is simultaneously introduced into the heat exchanger, where heat transfers from the hot cabin air to the cool outside air. The cooled cabin air is then directed to the cabin and heated outside air is expelled to the atmosphere. In a heating operation, a valve establishes fluid communication between the heat exchanger and the compressor. Cold air from the turbine is heated by air from the cabin, is further heated by the compressor, and is directed into the cabin, resulting in a net heating effect of the cabin.

Although the system of the '203 patent may be capable of heating and cooling a locomotive cab without resistive heating elements or a conventional air conditioner, it may still be less than optimal. Specifically, because the system of the '203 patent utilizes ambient air as a coolant and heat source, the system may suffer from a relatively low coefficient of performance.

The HVAC system of the present disclosure solve one or more of the problems set forth above and/or other problems with existing technologies.

SUMMARY

In one aspect, the disclosure is directed to an HVAC system for a mobile machine having a frame and a cabin supported by the frame. The HVAC system may include a first heat exchanger configured to exchange heat between coolant and the frame of the mobile machine, and a first pump configured to circulate coolant through the first heat exchanger. The HVAC system may also include a second heat exchanger configured to receive coolant from the first heat exchanger, and a fan configured to generate a flow of air through the second heat exchanger and into the cabin.

In another aspect, the disclosure is directed to a method of controlling an HVAC system in a mobile machine having a frame and a cabin supported by the frame. The method may include pumping coolant through a first heat exchanger, where heat may be exchanged between the coolant and the frame of the mobile machine. The method may also include pumping coolant from the first heat exchanger through a second heat exchanger, and generating a flow of air through the second heat exchanger and into the cabin.

DETAILED DESCRIPTION

Figure 1:
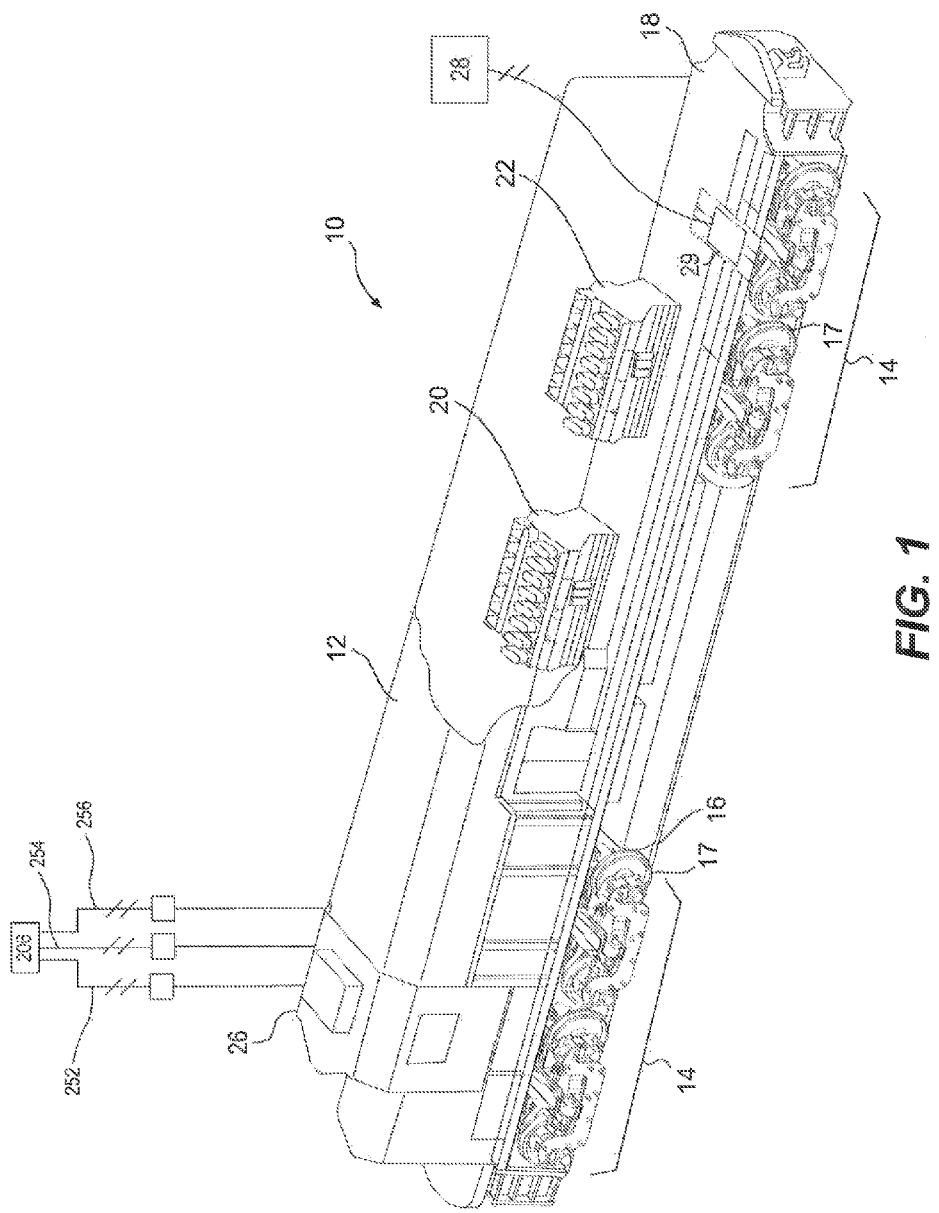
FIG. 1 is a pictorial illustration of an exemplary disclosed mobile machine.

FIG. 1 illustrates an exemplary embodiment of a mobile machine 10, such as a locomotive, that includes a car body 12 supported at opposing ends by a plurality of trucks 14 (e.g., two trucks 14). Each truck 14 may be configured to engage a track 16 via a plurality of wheels 17, and support a frame 18 of car body 12. Any number of engines may be mounted to frame 18 and configured to drive wheels 17 included within each truck 14. In the exemplary embodiment shown in FIG. 1, mobile machine 10 includes a first engine 20 and a second engine 22 that are lengthwise aligned on frame 18 in a travel direction of locomotive 10. One skilled in the art will recognize, however, that first engine 20 and second engine 22 may be arranged in tandem, transversally, or in any other orientation on frame 18. Further, first engine 20 and second engine 22 may be substantially similar or may alternatively have different rated power outputs. Mobile machine 10 may also include a cabin 26 operatively supported by frame 18, and electronics 28. Electronics 28 may include control electronics associated with operation of mobile machine 10. Alternatively or additionally, electronics 28 may be associated with traction motors 29 that propel wheels 17.

Frame 18 may form a structure that supports components of mobile machine 10, including but not limited to car body 12 and engines 20 and 22. For example, frame 18 may include box-like, tubular, or I-shaped beams and conduits formed in a design configured to provide the structure of mobile machine 10. Frame 18 may extend along substantially the entire length of mobile machine 12 and may be made from wrought-iron, mild steel, cast steel, or another suitable material.

Cabin 26 may be an onboard location from which an operator observes performance of mobile machine 10 and provides instructions for controlling mobile machine 10. In the disclosed example, cabin 26 is a substantially enclosed structure supported by frame 18 that includes one or more interface devices (not shown) located proximate an operator seat (not shown).

A plurality of traction motors 29 may be located between opposing wheels 17 and be configured to provide a rotational torque of mobile machine 10. Traction motors 29 may be DC electrical, AC electrical, or another suitable motor. Electronics 28 may additionally include choppers (not shown), or any other electronics utilized for driving mobile machine 10.

Figure 2:
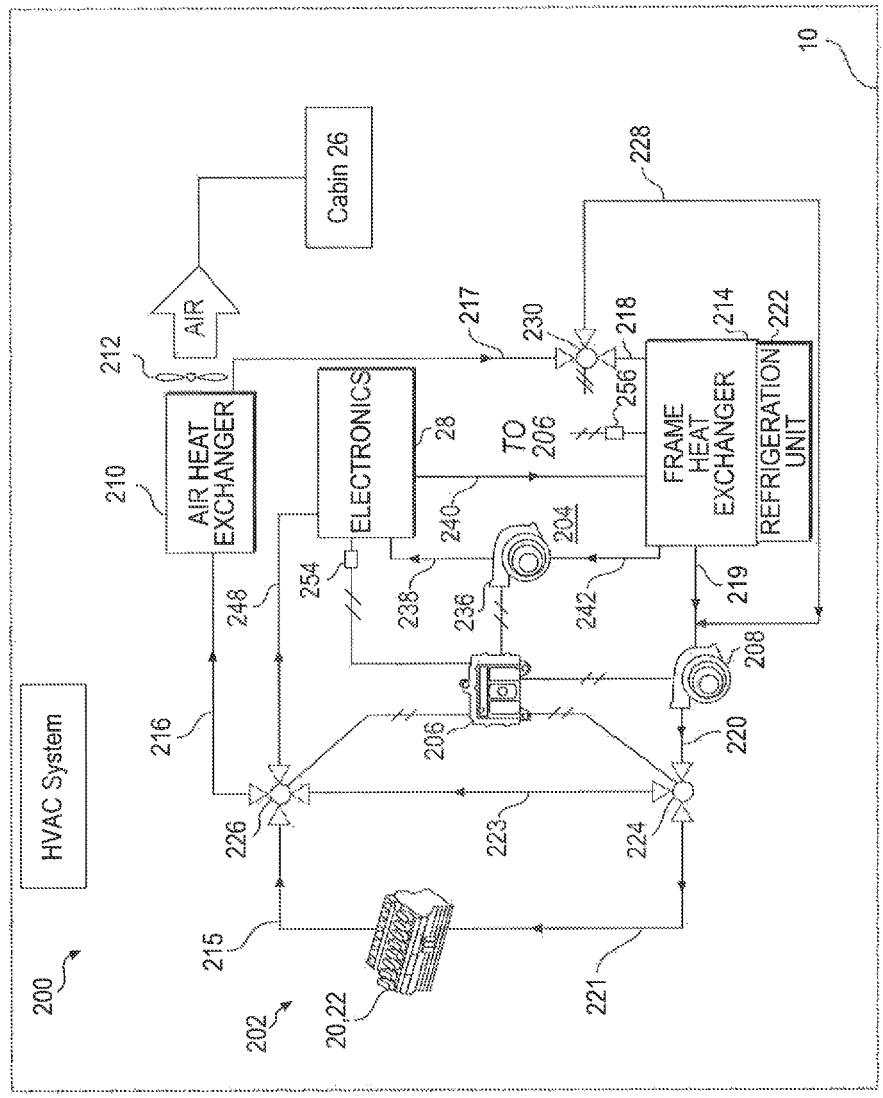
FIG. 2 is a diagrammatic illustration of an exemplary disclosed HVAC system that may be used in conjunction with the mobile machine of FIG. 1.

FIG. 2 illustrates an exemplary HVAC system 200 that promotes operator comfort within cabin 26. HVAC system 200 may include, among other things, a primary circuit 202 and an auxiliary circuit 204. Coolant flows may be regulated through one or both of primary and auxiliary circuits 202 and 204 by a controller 206 to adjust temperatures of cabin 26 and electronics 28 within desired limits.

Primary circuit 202 may include components that cooperate to selectively heat and cool cabin 26. In particular, primary circuit 202 may include a primary pump 208, an air heat exchanger 210, a fan 212, and a frame heat exchanger 214. Coolant may flow from engines 20, 22 to air heat exchanger 210 by way of passages 215 and 216. Coolant may exit air heat exchanger 210 and be directed to frame heat exchanger 214 by way of passages 217 and 218. Coolant may exit frame heat exchanger 214 and be directed back to engines 20, 22 via passages 219, 220, and 221. Primary pump 208 may be connected between passages 219 and 220 to generate the flow of coolant within primary circuit 202.

Primary pump 208 may be engine-driven to generate the flow of coolant described above. Coolant such as water, glycol, a water/glycol mixture, a blended air mixture, or any other heat transferring fluid may be pressurized by primary pump 208. In particular, primary pump 208 may include an impeller (not shown) disposed within a volute housing having an inlet and an outlet. As the coolant enters the volute housing, blades of the impeller may be rotated by operation of one or both of engines 20, 22 to push against the coolant, thereby pressurizing the coolant. An input torque imparted by one or both of engines 20, 22 to primary pump 208 may be related to a pressure of the coolant, while a speed imparted to primary pump 208 may be related to a flow rate of the coolant. It is contemplated that primary pump 208 may alternatively embody a piston type pump, if desired, and may have a variable or constant displacement. It is also contemplated that primary pump 208 may alternatively be electrically driven, if desired.

Air heat exchanger 210 may be situated to transfer heat between coolant that has been previously heated by operation of one of engines 20, 22, heated by frame heat exchanger 214, or cooled by frame heat exchanger 214 and air as it is forced into cabin 26 by fan 212. In the disclosed embodiment, fan 212 may be electrically powered so that it can be mounted at a location remote from engines 20, 22, for example in a dashboard, wall, or ceiling of cabin 26. It is contemplated, however, that fan 212 could alternatively be mechanically driven by one of engines 20, 22, if desired, and remotely connected to cabin 26 by way of one or more conduits (not shown). In any of these configurations, a temperature of the air entering cabin 26 may be at least partially dependent on a flow rate of coolant passing through air heat exchanger 210, a temperature of the coolant entering air heat exchanger 210, a flow rate of the air passing through air heat exchanger 210, and a temperature of the air entering air heat exchanger 210.

Frame heat exchanger 214 may be configured to transfer heat between coolant within primary circuit 202 and frame 18. In one embodiment, frame heat exchanger 214 may include coils (not shown) embedded within or otherwise in thermal contact with frame 18. In this embodiment, coolant flowing through the coils of frame heat exchanger 214 may either discharge heat to or absorb heat from frame 18, depending on a temperature of the coolant and a temperature of frame 18. After being drawn from frame heat exchanger 214 through passage 219, the coolant may be pushed by primary pump 208 through passages 220 and 221 back to engines 20, 22. Coolant flowing through frame 18 may alternatively or additionally discharge heat to or absorb heat from frame 18 via a high-pressure refrigeration unit 222 located within or otherwise associated with frame heat exchanger 214, if desired.

Refrigeration unit 222 may include an engine-driven compressor, a condenser, and an evaporator that are coupled to each other via a closed-circuit. The compressor may be configured to compress a refrigerant, for example R-134, propane, nitrogen, helium, or another high-pressure fluid known in the art. As the refrigerant is pressurized, it is vaporized and moves into the condenser as a high-pressure gas. Within the condenser, the refrigerant cools and condenses back into liquid form at a lower energy state than when initially within the compressor. The refrigerant may cool by releasing heat to frame 18. The lower-energy liquid then passes into the evaporator, where it is expanded, causing a rapid drop in temperature. Coolant from primary circuit 202 may transfer heat with the evaporator, chilling the coolant and warming the refrigerant in preparation for another cycle. Refrigeration unit 222 may be selectively activated by controller 206 based on the temperature of frame 18, the temperature of cabin 26, and the HVAC operation selected, if desired. Refrigeration circuit 222 may be selectively reversible to allow compressed refrigerant to transfer heat to coolant flowing through primary circuit 202 and absorb heat from frame 18, if desired.

Primary circuit 202 may be equipped with an engine bypass 223, a first control valve 224 located at an upstream end of engine bypass 223, and a second control valve 226 located at a downstream end of engine bypass 223. First control valve 224 may be a proportional type valve having a valve element movable to regulate a flow of coolant through passages 221 and/or 223 and the corresponding temperature of the coolant within air heat exchanger 210. The valve element in first control valve 224 may be solenoid-operable to move between a flow-passing position and a flow-blocking position. In the flow-passing position, first control valve 224 may permit substantially all of the coolant to flow through passage 221 and one or both of engines 20, 22. In the flow-blocking position, first control valve 224 may completely block coolant from flowing to one or both of engines 20, 22 by diverting substantially all the coolant to flow through engine bypass 223 to second control valve 226. First control valve 224 may also include an intermediate position in between the flow-passing position and the flow-blocking position. In the intermediate position first control valve 224 may permit some of the coolant to flow to engines 20, 22 via passage 221, while diverting a remaining portion of the coolant through engine bypass 223.

Primary circuit 202 may also be equipped with a frame heat exchanger bypass 228 and a third control valve 230 located at an upstream end of frame heat exchanger bypass 228. The downstream end of frame heat exchanger bypass 228 may be connected to passage 219. Coolant from air heat exchanger 210 may enter third control valve 230 via passage 217. Third control valve 230 may be similar to first control valve 224 but be configured to control the flow of coolant through frame heat exchanger 214 via passage 218 or around frame heat exchanger 214 via frame heat exchanger bypass 228. Frame heat exchanger bypass 228 may be part of a primary cooling circuit of engines 20, 22, and may additionally include mechanisms for reducing the temperature of spent coolant such as a radiator (not shown), if desired.

Auxiliary circuit 204 may include an auxiliary pump 236, and passages 238, 240, 242, and 248. Auxiliary pump 236 may connected at an upstream end of electronics 28 by passage 238. Electronics 28 may be connected to frame heat exchanger 214 by passage 240. Frame heat exchanger 214 may be connected to auxiliary pump 236 by passage 242. Auxiliary pump 236 may be substantially similar to primary pump 208 and may be configured to act as a primary or secondary cooling source of electronics 28. Auxiliary pump 236 may pressurize and direct coolant to electronics 28 via passage 238. Coolant, having absorbed heat from electronics 28, may enter frame heat exchanger 214 via passage 240. After discharging heat to frame 18 via frame heat exchanger 214, the coolant may then be redirected to electronics 28 by auxiliary cooling pump 236 via passages 242 and 238. Alternatively or additionally, electronics 28 may be cooled by coolant from primary circuit 202 via passage 248 and second control valve 226. Second control valve 226 may be similar to first control valve 224 and third control valve 230, but be configured to control the flow of coolant from primary circuit 202 through air heat exchanger 210 via passage 216 and/or through electronics 28 via passage 248.

Controller 206 may be a single microprocessor or multiple microprocessors that include a mechanism for controlling an operation of HVAC system 200. Numerous commercially available microprocessors can be configured to perform the functions of controller 206. It should be appreciated that controller 206 could readily be embodied in a general engine or machine microprocessor capable of controlling numerous engine and/or machine functions. Controller 206 may include a memory, a secondary storage device, a processor, and any other components for running an application. Various other circuits may be associated with controller 206 such as power supply circuitry, signal conditioning circuitry, solenoid driver circuitry, and other types of circuitry.

Controller 206 may rely on input from one or more sensors during regulation of HVAC system 200. In the disclosed exemplary embodiment, controller 206 may rely on at least one sensor 252 associated with cabin 26, at least one sensor 254 associated with electronics 28, and at least one sensor 256 associated with frame 18, although any number and types of sensors may be utilized. Sensors 252, 254, and 256 may embody, for example, temperature sensors configured to generate signals indicative of an ambient temperature within cabin 26, a temperature of electronics 28, and a temperature of frame 18, respectively. Sensors 252, 254, and 256 may direct signals to controller 206 for further processing.

Figure 3:
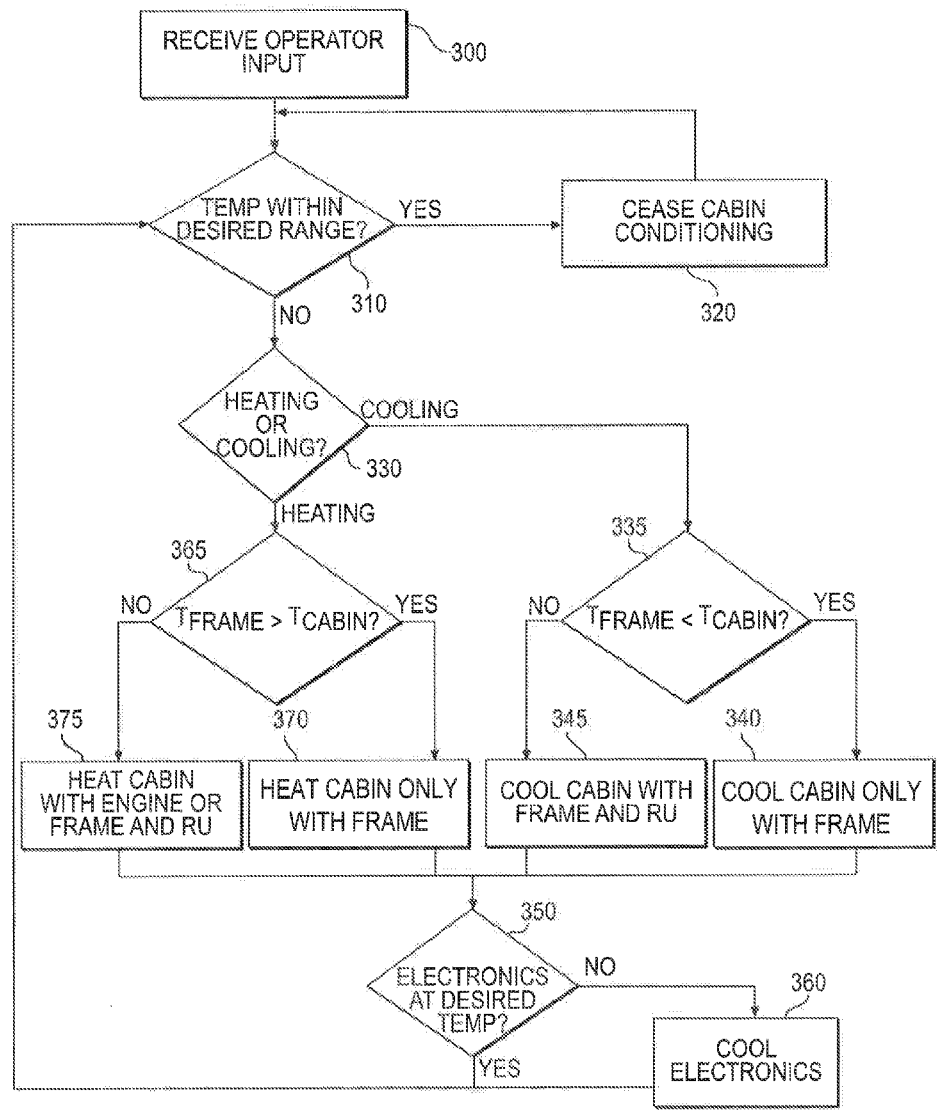
FIG. 3 is a flowchart depicting an exemplary disclosed method of controlling the HVAC system of FIG. 2.

FIG. 3 illustrates an exemplary HVAC system process performed by controller 206. FIG. 3 will be discussed in more detail in the following section to better illustrate the disclosed concepts.

INDUSTRIAL APPLICABILITY

The disclosed HVAC system may be applicable to any engine, power system, or mobile machine where space and efficiency of temperature control mechanisms are a concern. The disclosed HVAC system may allow for efficient heating and cooling of mobile machine interior volumes and electronics in a compact configuration. Additionally, the disclosed HVAC system may be relatively inexpensive.

The operator of machine 10 may activate HVAC system 200 at any time via an onboard interface (not shown). For example, the operator may select a desired mode of operation (e.g., air conditioning or heating) and a desired temperature of cabin 26 (e.g., 70° F.). Controller 206 may receive this input (Step 300) and a signal from sensor 252 indicative of an actual temperature of cabin 26 (e.g., 75° F.), and determine if the actual cabin temperature is within an acceptable range (e.g., +/−2° F.) of the desired temperature (Step 310). If the actual temperature is within the acceptable range of the desired temperature (Step 310: Yes), any conditioning of ambient conditions currently ongoing may cease (Step 320), and control may return to step 310.

If at Step 310, however, controller 206 determines that the actual temperature in cabin 26 is not within the acceptable range of the desired temperature (Step 310: No), controller 206 may then determine if a cooling or a heating signal was received from the operator (Step 330). If controller 206 received a cooling signal (Step 330: Cooling), controller 206 may proceed to Step 335 to determine if a temperature sensed by frame temperature sensor 256 is lower than a temperature sensed by cabin temperature sensor 252.

If the frame temperature is lower than the cabin temperature, controller 206 may activate primary circuit 202 to cool cabin 26 by using only frame 18 as a heat sink (Step 340). In particular, controller 206 may direct primary pump 208 to generate a flow of coolant through air heat exchanger 210, and simultaneously direct electrical current to fan 212 to generate a flow of air through air heat exchanger 210 and into cabin 26. Controller 206 may also cause control valves 224 and 230 to move to positions that divert all coolant flow through engine bypass 223 and passage 218, respectively. In this capacity, frame heat exchanger 214 may absorb heat from coolant flowing therein. The chilled coolant may then absorb heat discharged by air forced through air heat exchanger 210. The cooled air may be directed into cabin 26 through air heat exchanger 210 by fan 212.

If at step 335 controller 206 instead determines that the frame temperature is higher than the cabin temperature, controller 206 may be unable to adequately cool cabin 26 using only frame 18, and proceed to step 345. Controller 206 may operate in substantially the same manner as in step 340, except controller 206 may additionally activate refrigeration unit 222 to chill coolant flowing through primary circuit 202. That is, because the frame temperature is above the cabin temperature, additional energy must be expended in order to cool cabin 26. In this situation, coolant from air heat exchanger 210 may enter frame heat exchanger 214 via passages 217 and 218. The coolant may then transfer heat to expanded and superchilled refrigerant within refrigeration unit 222, which then forces heat into frame 18. By transferring heat to refrigerant in refrigeration unit 222, frame 18 may be used to accept heat from air within cabin 26, even when frame 18 is warmer than cabin 26. Alternatively, controller 206 may proceed to step 345 even when the frame temperature is lower than the cabin temperature, but within a predetermined range (e.g. 5° F.). In this situation, because the frame temperature is relatively close to the cabin temperature, cooling of cabin 26 using only frame 18 may be relatively slow and inefficient.

From Steps 340 and 345, controller 206 may then determine if electronics 28 are at a desired temperature based on a temperature signal output by sensor 254 (Step 350). If controller 206 determines that electronics 28 are at a suitable temperature, the process may return to Step 310. However, if controller 206 determines that electronics 28 are above a desired operating temperature, controller 206 may initiate cooling of electronics 28 (Step 360), by sending a signal to second control valve 226 to divert some coolant from engine bypass 223 to electronics 28. Alternatively, controller 206 may send a signal to auxiliary pump 236 to pressurize and direct coolant through electronics 28 via passages 242 and 238. While currently described as secondary to cabin conditioning, cooling of electronics 28 may alternatively occur simultaneous with or before cabin conditioning, if desired.

If controller 206 received a heating signal from the operator of mobile machine 10 at step 330, controller 206 may proceed to Step 365 to determine if a temperature sensed by frame temperature sensor 256 is higher than a temperature sensed by cabin temperature sensor 252.

If the frame temperature is higher than the cabin temperature, controller 206 may activate primary circuit 202 to heat cabin 26 using only frame 18 (Step 370). In particular, controller 206 may direct primary pump 208 to generate a flow of coolant through air heat exchanger 210, and simultaneously direct electrical current to fan 212 to generate a flow of air through air heat exchanger 210 and into cabin 26. Controller 206 may also cause control valves 224 and 230 to move to positions that divert all coolant flow through engine bypass 223 and passage 218, respectively. In this capacity, frame 18 may act as a heat source and transfer heat to coolant flowing within frame heat exchanger 214. The heated coolant may then transfer heat to air forced through air heat exchanger 210. The heated air may be redirected into cabin 26 by fan 212.

If at step 365 controller 206 instead determines that the frame temperature is lower than the cabin temperature, controller 206 may be unable to adequately heat cabin 26 by using only frame 18, and proceed to step 375. Controller 206 may operate in substantially the same manner as in step 370, except controller 206 may additionally activate refrigeration unit 222 to heat coolant flowing through primary circuit 202. That is, because the frame temperature is below the cabin temperature, additional energy must be expended in order to heat cabin 26. In this situation, coolant from air heat exchanger 210 may enter frame heat exchanger 214 via passages 217 and 218. The coolant may then absorb heat from compressed and superheated refrigerant within refrigeration unit 222, which forces heat into the coolant. By utilizing refrigeration unit 222, frame 18 may be used to transfer heat to air within cabin 26, even when frame 18 is cooler than cabin 26. Alternatively, controller 206 may proceed to step 375 even when the frame temperature is higher than the cabin temperature, but within a predetermined range (e.g. 5° F.). In this situation, because the frame temperature is relatively close to the cabin temperature, heating of cabin 26 using only frame 18 may be relatively slow and inefficient. It should be noted that in steps 345 and 375, refrigerant may flow within refrigeration unit 222 in opposite directions, if desired.

Alternatively or additionally, controller 206 may utilize one or both of engines 20, 22 at step 370 or step 375 to initiate or supplement heating of cabin 26. Controller 206 may still direct primary pump 208 to generate a flow of coolant through air heat exchanger 210, and simultaneously direct electrical current to fan 212 to generate a flow of air through air heat exchanger 210 and into cabin 26. However, in contrast to the embodiment described above where frame 18 is used alone as a heat source, controller 206 may cause first control valve 224 to move to a position that allows at least some coolant flow through passage 221. In this capacity, one or both of engines 20, 22 may act as an additional heat source and transfer heat to coolant flowing therein. The heated coolant may then transfer heat to air forced into air heat exchanger 210. Additionally, controller 206 may cause third control valve 230 to move to a position that allows at least some coolant to flow through frame heat exchanger bypass 228 in order to prevent heat loss from coolant to a cold frame 18, if desired. The heated air may be redirected into cabin 26 by fan 212. From Steps 370 or 375, controller 206 may proceed to Step 350.

The disclosed HVAC system 200 may provide an efficient mechanism for heating and cooling of a mobile machine cabin. For example, the disclosed HVAC system 200 may operate at a higher coefficient of performance than existing air-to-air heat pump systems because frame 18 and engines 20, 22 may provide large, stable sources of heat or heat sinks. That is, frame 18 and engines 20, 22 are relatively large thermal masses that may not fluctuate as much in temperature as ambient air in response to weather conditions. The disclosed HVAC system 200 may also help to reduce maintenance requirements.

It will be apparent to those skilled in the art that various modifications and variations can be made to the disclosed HVAC system without departing from the scope of the disclosure. Other embodiments of the HVAC system will be apparent to those skilled in the art from consideration of the specification and practice of the HVAC system disclosed herein. For example, mobile machine 10 may alternatively be an automobile or a marine vessel, and frame 18 may be an automobile frame or the hull of a marine vessel. It is intended that the specification and examples be considered as exemplary only, with a true scope of the disclosure being indicated by the following claims and their equivalents.

What is claimed is:

1. An HVAC system for a mobile machine having a frame and a cabin supported by the frame, the HVAC system comprising:
    a first heat exchanger configured to exchange heat between coolant and the frame of the mobile machine;
    a first pump configured to circulate coolant through the first heat exchanger;
    a second heat exchanger configured to receive coolant from the first heat exchanger;
    a first temperature sensor configured to generate a first signal indicative of an actual cabin temperature;
    a second temperature sensor configured to generate a second signal indicative of a frame temperature;
    a controller in communication with the first temperature sensor and the second temperature sensor, and configured to:
        receive an indication of a desired cabin temperature; and
        selectively activate the first pump based on a comparison of the actual and desired cabin temperatures; and
    a fan configured to generate a flow of air through the second heat exchanger and into the cabin.

2. The HVAC system of claim 1, wherein the controller is further configured to:
    selectively chill coolant using only the frame as a heat sink when the desired cabin temperature is lower than the actual cabin temperature and the frame temperature is lower than the actual cabin temperature; and
    selectively heat coolant using only the frame as a heat source when the desired cabin temperature is higher than the actual cabin temperature and the frame temperature is higher than the actual cabin temperature.

3. The HVAC system of claim 2, wherein:
    the first heat exchanger further includes a refrigeration unit configured to exchange heat between a refrigerant and the frame of the mobile machine; and
    the controller is further configured to:
        selectively chill coolant using the frame as a heat sink and activate the refrigeration unit when the desired cabin temperature is lower than the actual cabin temperature and the frame temperature is higher than the actual cabin temperature; and
        selectively heat coolant using the frame and activate the refrigeration unit when the desired cabin temperature is higher than the actual cabin temperature and the frame temperature is lower than the actual cabin temperature.

4. The HVAC system of claim 1, wherein:
the mobile machine includes an engine; and
the HVAC system further includes:
   a passage connecting the engine with the second heat exchanger; and
   a first control valve fluidly connected downstream of the first heat exchanger and movable by the controller to selectively direct coolant through the engine when the desired cabin temperature is higher than the actual cabin temperature.

5. The HVAC system of claim 4, further including:
an engine bypass fluidly connected downstream of the first control valve and configured to direct coolant around the engine; and
a second control valve fluidly connected downstream of the engine and the engine bypass and upstream of the second heat exchanger, wherein the controller is further configured to move the first control valve to direct coolant through the engine bypass to the second control valve when the desired cabin temperature is lower than the actual cabin temperature.

6. The HVAC system of claim 5, wherein the second control valve is movable by the controller to selectively direct coolant to electronics of the mobile machine or to the second heat exchanger.

7. The HVAC system of claim 5, further including:
a third control valve located downstream of the second heat exchanger; and
a first heat exchanger bypass disposed between the first control valve and the third control valve, wherein the controller is further configured to:
   move the third control valve to direct coolant to the first control valve through the first heat exchanger bypass when the desired cabin temperature is higher than the actual cabin temperature; and
   move the third control valve to direct coolant through the first heat exchanger when the desired cabin temperature is lower than the actual cabin temperature.

8. The HVAC system of claim 1, further including:
a third temperature sensor configured to generate a third signal indicative of a temperature of electronics of the mobile machine; and
an auxiliary pump configured to pump coolant from the first heat exchanger to the electronics of the mobile machine, wherein the controller is further configured to activate the auxiliary pump when a desired temperature of the electronics is lower than an actual temperature of the electronics.

9. The HVAC system of claim 8, wherein the electronics of the mobile machine are configured to be electrically associated with a traction motor configured to propel the mobile machine.

10. A mobile machine, comprising:
a frame;
an engine mounted to the frame;
a cabin supported by the frame;
a first temperature sensor configured to generate a first signal indicative of an actual cabin temperature;
a first heat exchanger configured to exchange heat between coolant and the frame;
a first pump configured to circulate coolant through the first heat exchanger;
a second heat exchanger configured to receive coolant from the first heat exchanger;
a fan configured to generate a flow of air through the second heat exchanger and into the cabin;
an engine bypass;
a first control valve fluidly connected downstream of the first heat exchanger and movable to direct coolant through the engine or around the engine via the engine bypass;
a second control valve fluidly connected downstream of the engine and the engine bypass and upstream of the second heat exchanger;
a third control valve downstream of the second heat exchanger;
a first heat exchanger bypass disposed between the first control valve and the third control valve; and
a controller in communication with the first temperature sensor, the first, second, and third control valves and configured to:
   receive an indication of a desired cabin temperature;
   move the first control valve to direct coolant through the engine bypass to the second control valve when the desired cabin temperature is lower than the actual cabin temperature;
   move the third control valve to direct coolant to the first control valve through the first heat exchanger bypass when the desired cabin temperature is higher than the actual cabin temperature; and
   move the third control valve to direct coolant through the first heat exchanger when the desired cabin temperature is lower than the actual cabin temperature.

11. The mobile machine of claim 10, further including a second temperature sensor configured to generate a second signal indicative of a frame temperature, wherein the controller is further configured to:
selectively chill coolant using only the frame as a heat sink when the desired cabin temperature is lower than the actual cabin temperature and the frame temperature is lower than the actual cabin temperature; and
selectively heat coolant using only the frame as a heat source when the desired cabin temperature is higher than the actual cabin temperature and the frame temperature is higher than the actual cabin temperature.

12. The mobile machine of claim 11, wherein:
the first heat exchanger further includes a refrigeration unit configured to exchange heat between a refrigerant and the frame; and
the controller is further configured to:
   selectively chill coolant using the frame as a heat sink and activate the refrigeration unit when the desired cabin temperature is lower than the actual cabin temperature and the frame temperature is higher than the actual cabin temperature; and
   selectively heat coolant using the frame and activate the refrigeration unit when the desired cabin temperature is higher than the actual cabin temperature and the frame temperature is lower than the actual cabin temperature.

13. The mobile machine of claim 10, further including:
a third temperature sensor configured to generate a third signal indicative of a temperature of electronics of the mobile machine; and
an auxiliary pump configured to pump coolant from the first heat exchanger to the electronics of the mobile machine, wherein the controller is further configured to activate the auxiliary pump when a desired temperature of the electronics is lower than an actual temperature of the electronics.

14. The mobile machine of claim 10, further including electronics, wherein the second control valve is movable by the controller to selectively direct coolant to the electronics or to the second heat exchanger.

\* \* \* \* \*